Jan. 26, 1954
D. N. SEWELL
2,666,985
WRECKING TOOL
Filed April 14, 1952
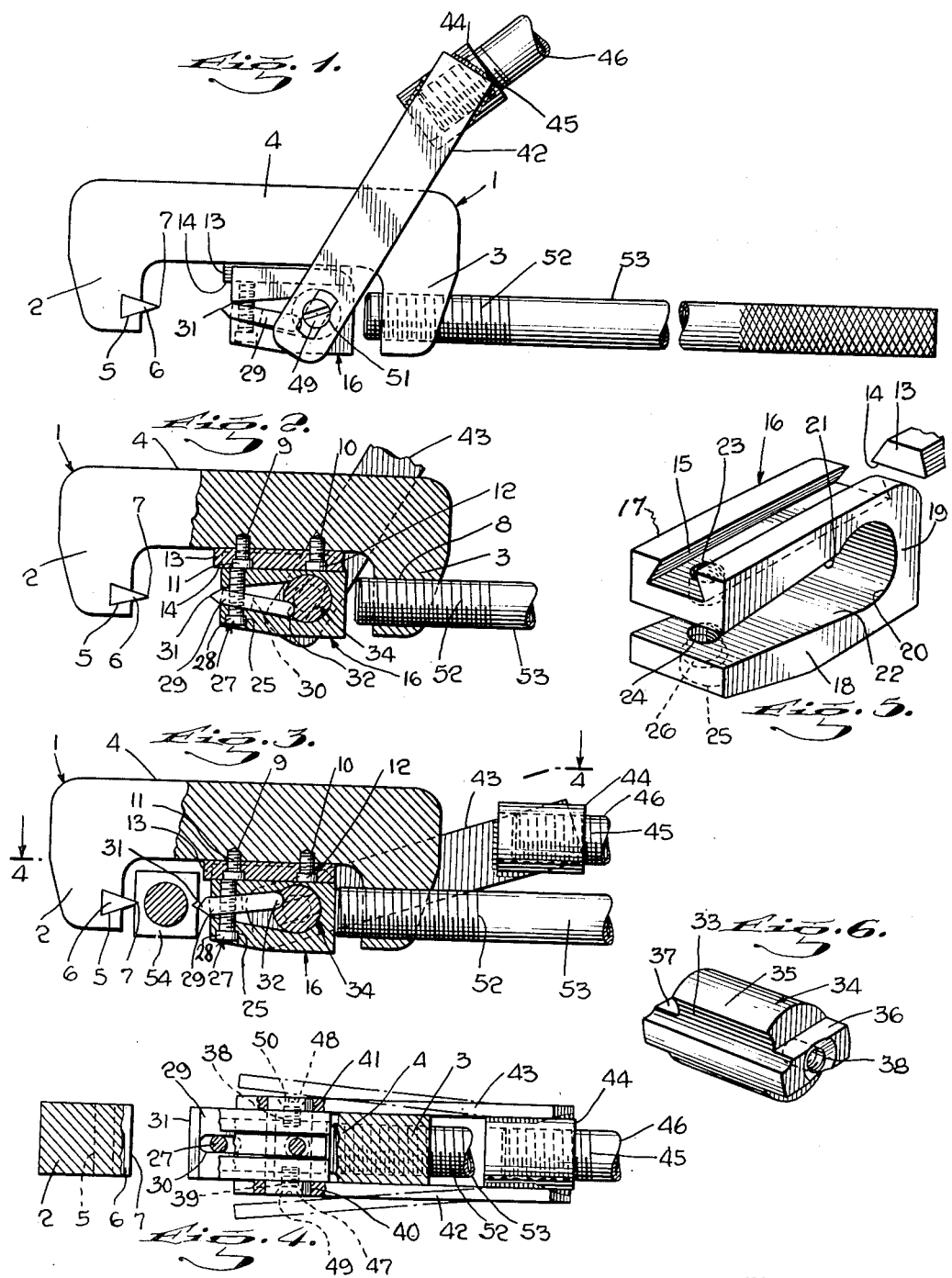
INVENTOR
DONALD N. SEWELL
BY Gustov Drews
his ATTORNEY Patented Jan. 26, 1954

2,666,985

UNITED STATES PATENT OFFICE 2,666,985

WRECKING TOOL

Donald N. Sewell, Kennett Square, Pa.

Application April 14, 1952, Serial No. 282,177

4 Claims. (Cl. 30—182)

This invention relates to wrecking tools in general and more especially to manually operated tools for splitting nuts and the like.

Among the objects of the present invention it is aimed to provide an improved wrecking tool which can be carried by the user to any desired place in the field, irrespective of the accessibility of the part of the construction to receive attention.

It is still another object of the present invention to provide a manually operated wrecking tool which can generate excessive cutting power by hand without endangering adjacent parts of the structure receiving attention.

These and other features, capabilities and advantages of the present invention will appear from the subjoined detailed description of one specific embodiment thereof illustrated in the accompanying drawings, in which Fig. 1 is a side elevation partly broken away in open position.

Fig. 2 is a similar fragmental view partly in section.

Fig. 3 is a view similar to Fig. 2 showing the gripping arm after it has completed a cutting operation.

Fig. 4 is a section on the line 4—4 of Fig. 3.

Fig. 5 is an exploded perspective of the carrier and guide.

Fig. 6 is a perspective of the barrel.

In the embodiment illustrated there is provided a claw 1 having two opposing arms 2 and 3 connected to one another by the intermediate portion 4. The arm 2 in the present instance is provided with a bayonet slot 5 frictionally to receive a gripping tool 6 consisting of a bar composed of a suitably hardened tool steel substantially triangular in cross section to fit the slot 5 with its gripping edge 7 extending therefrom as shown in Fig. 1. Obviously with a friction fit between the bar 6 and the arm 2 it will require a heavy blow to force the bar 6 into the slot 5.

In the arm 3, on the other hand, there is provided an internally screw threaded opening 8, and in the intermediate portion 4 there are provided two tapped internally screw threaded openings 9 and 10 to receive the screws 11 and 12 passing through the guide 13. The guide 13 is trapezoidal in cross section with its wider base 14 positioned outwardly of the intermediate portion 4 to receive the bayonet slot 15 of the carrier 16.

The carrier 16 is also claw formed having the two arms 17 and 18 which extend from the intermediate portion 19 with a circular arcuate opening defined by the arcuate portion 20 of the inner faces of the arms 17 and 18 and intermediate portion 19 adjacent one another. The inner opposing faces 21 and 22 of the arms 17 and 18, respectively, after leaving the arcuate portion 20, approach one another as they extend outwardly from the arcuate portion 20. The arm 17 adjacent its outer free end is provided with an internally screw threaded tapped opening 23 in alinement with the opening 24 in the arm 18 in communication with the outer, wider opening 25 forming an annular shoulder 26 between the openings 24 and 25 to receive a screw 27, screw threadedly connected in the opening 23 with its head 28 resting on the shoulder 26. The screw 27 is provided to form an anchor for the cutting tool 29 which has an opening 30 freely to receive the shank of the screw 27. The cutting tool 29 is preferably composed of a suitably hardened tool steel or the like having a cutting end 31 and a rounded inner end 32 to fit in the arcuate recess 33 formed in the barrel 34 receding from the cylindrical face 35 thereof. The barrel 34 has two segmental projections 36 and 37 projecting from its ends in alinement with one another with screw threaded tapped openings 38 and 39, respectively, in the same, disposed substantially concentric to the cylindrical surface 35 of the barrel 34.

The sections 36 and 37 are provided to enter the elongated slots 40 and 41 in the ends of the arms 42 and 43, respectively, secured to the coupling 44 by being welded thereto or otherwise secured thereto. The coupling 44 is in the present instance internally screw threaded to receive the threaded end 45 of the tubular handle 46.

In order to assemble the parts so far described, it is only necessary slidably to mount the carrier 16 on the guide 13, and then secure the guide 13 in place by first clearing one side of the guide 13 to gain access to one of the screws 11 or 12 and secure such screw in place, and then sliding the carrier 16 over to the other side to clear the other screw 11 or 12, and securing it in place. Thereupon the barrel 34 is placed in the arcuate opening 20, and the cutting tool 29 positioned with its rounded end 32 in the recess 33 and the cutting end 31 extending beyond the free ends of the arms 17 and 18, and then the screw 27 secured in place to extend through the opening 30 in the cutting tool 29. Thereupon without freeing the arms 42 and 43 from the coupling 44, the outer free ends are forced over the projections 36 and 37, relying upon the resiliency in the metal of the arms 42 and 43, and then the screws 47 and 48 secured in the ends of the projections 36 and 37, respectively, with the edges of the heads 49 and 50 of the screws 47 and 48 extending beyond the projections 36 and 37 and engaging the inner faces of the countersunk recesses 51 formed in the arms 42 and 43.

In the threaded opening 8 there is screw threadedly connected the threaded end 52 of the tubular arm 53.

In the operation of the device, the work to be cut, such as the nut 54, is positioned between the gripping edge 7 of the tool 6 and the cutting edge 31 of the cutting tool 29, and then the arm 53 turned to anchor the carrier 16 with the cutting edge 31 of the cutting tool 29 in firm engagement with the nut 54. Thereupon, assuming the arm 46 to be in its outermost position, it will only be necessary to swing the arm 46 toward the arm 53 when the cutting edge 31 will be forced into the nut 54 while being rocked from one side to the other. If the first actuation is not sufficient to split the nut 54, the arm 46 is again swung into its outermost position, the arm 53 then turned again to clamp the nut 54 securely in position between the cutting edge 31 and the gripping edge 7, and then the arm 46 again actuated, that is, swung toward the arm 53. This operation may be repeated a number of times before the splitting of the nut 54 is completed. It will thus be seen that the present tool presents an effective manually operated tool for successive cutting operations of a device to be cut or split, that the tool need not be excessively heavy, and consequently may be conveniently carried on the person of the wearer, and in turn due to its leverage operation, adjacent parts of the structure receiving attention are not endangered as would be the case by an acetylene torch or by the concussion that accompanies a hammer blow.

It is obvious that various changes and modifications may be made to the details of construction without departing from the general spirit of the invention as set forth in the appended claims.

I claim:
1. The combination with a claw having two opposing arms, a work gripping tool on one of said arms extending inwardly, a carrier slidably mounted between said arms on said claw, a cutting tool rockably and slidably mounted in said carrier, a positioning bar operatively mounted on the other of said arms for engaging and positioning said carrier to anchor the work between said gripping tool and said cutting tool, a lever, and rotatable means supported in said carrier and operatively connected to said cutting tool, said lever connected to said rotatable means to enable actuation of said lever in turn to advance and rock said cutting tool into cutting operation on the work.

2. The combination as set forth in claim 1 in which said rotatable means consists of a barrel rotatably mounted on said carrier to which said lever is fixed.

3. The combination as set forth in claim 1 in which said rotatable means consists of a barrel rotatably mounted on said carrier to which said lever is fixed, and in which said carrier has a pin and said cutting tool has an opening through which said pin extends to permit the free rocking motion of said cutting tool about said pin, and said barrel has a recess to receive one end of said cutting tool to rock the same about said pin when said lever is actuated.

4. The combination as set forth in claim 1 in which said positioning bar is screw threadedly connected to said other arm to enable one end thereof to engage said carrier when said bar is rotated relative to the said arm in turn to anchor the work between the gripping tool and the cutting tool for an initial cut and successive deeper cuts.

DONALD N. SEWELL.

References Cited in the file of this patent
UNITED STATES PATENTS

| Number | Name | Date |
|---|---|---|
| 165,402 | Bates | July 13, 1875 |
| 396,877 | Kennedy | Jan. 29, 1889 |
| 674,088 | Hoak | May 14, 1901 |
| 951,016 | Loock | Mar. 1, 1910 |
| 1,373,861 | Briles | Apr. 5, 1921 |
| 1,819,135 | Sudre | Aug. 18, 1931 |
| 2,165,209 | Baldanza | July 11, 1939 |